UNITED STATES PATENT OFFICE.

NOAH WRINKLE AND WALTER A. KUHNERT, OF SAN FRANCISCO, CALIFORNIA.

METHOD OF SEPARATING BORAX FROM POTASSIUM CHLORID.

1,350,090.    Specification of Letters Patent.    Patented Aug. 17, 1920.

No Drawing.    Application filed July 21, 1919. Serial No. 312,254.

*To all whom it may concern:*

Be it known that we, NOAH WRINKLE and WALTER A. KUHNERT, citizens of the United States, and residents of San Francisco, in the county of San Francisco and State of California, have invented new and useful Improvements in Methods of Separating Borax from Potassium Chlorid, of which the following is a specification.

The present invention relates to improvements in methods of obtaining potassium chlorid and borax from certain waters which contain potassium chlorid and borax and other salts. Such waters comprise inland lakes, solutions formed by dissolving in water the salts deposited on the bottoms of dry lakes, and solutions formed by dissolving in water salts obtained by evaporation of waters of such inland lakes.

Waters to which it is intended to apply our improved process, may, and many do, contain such minerals as sodium carbonate, sodium bi-carbonate, sodium sulfate, sodium chlorid, sodium borate, potassium chlorid and other minerals. Among such waters is that from Searles Lake in California of which the following is the composition:—

| | |
|---|---|
| $Na_2CO_3$ | 4.10% |
| $Na_2SO_4$ | 6.60 |
| NaCl | 7.20 |
| KCl | 4.00 |
| $Na_2B_4O_7$ | 1.03 |
| Water | 77.07 |

Also that from Owens Lake in California, of which the following is the composition:—

| | |
|---|---|
| $Na_2CO_3$ | 8.50% |
| $Na_2SO_4$ | 3.02 |
| NaCl | 9.06 |
| KCl | 6.00 |
| $Na_2B_4O_7$ | 3.60 |
| Water | 69.92 |

The solution is concentrated by evaporation and thereby the proportion of potassium chlorid and borax therein is increased and at the same time some of the more insoluble salts may be eliminated; or there may be obtained a mixture of crude salts by permitting the solution to cool with the deposition of crystals of potassium chlorid, borax, and other salts. In this manner, there has been obtained from the waters of Searles Lake the following composition:—

| | |
|---|---|
| $Na_2CO_3$ | 1.70% |
| $Na_2SO_4$ | 0.44 |
| NaCl | 10.93 |
| KCl | 66.34 |
| $Na_2B_4O_7$ | 10.91 |
| Water | 9.66 |

Our method of treatment is as follows:—

Having a solution, preferably saturated at atmospheric temperature with potassium chlorid, we treat the solution at a temperature of about 40° C. with carbon dioxid obtained from a lime kiln or other suitable source. This treatment is for the purpose of effecting removal from the solution of sodium carbonate, which is converted to sodium bi-carbonate insoluble in the solution and removable therefrom. The liquor is then further concentrated by evaporation to the saturation point of potassium chlorid at the temperature employed to effect the evaporation.

We then permit the solution to cool and deposit mixed crystals of potassium chlorid, borax, sodium chlorid, and other salts. These mixed crystals are removed from the liquor; and the liquor, still retaining some potassium chlorid, borax, and other salts, is mixed with other solutions that are undergoing the preceding steps of the process.

We have found that it is difficult to effect separation of potassium chlorid and borax by any of the usual methods of fractional crystallization, but that less difficulty is experienced when boric acid is also present in the solution. We have found that the normal solubility of borax and boric acid is greatly increased when they exist in solution together. By converting into boric acid a sufficient portion of the borax in such solutions and mixtures of salts as we have described, we find that the borax and boric acid will be retained in solution until after the greater portion of the potassium chlorid has been separated by cooling of the hot saturated solutions thereof. Our preferred procedure is to obtain mixed crystals of potassium chlorid, borax, sodium chlorid, and other salts, as described in the preceding step of our process.

These crystals are then added to a sufficient quantity of hot water 90–100° C. containing the necessary amount of sulfuric acid, or any other acidifying agent suitable for the purpose, to convert from 30 to 50 per cent. of the borax present to boric acid and effecting complete solution of the borax and boric acid therein while leaving undissolved the greater portion of the potassium chlorid. The solution is then cooled to about 70° C. and the undissolved potassium chlorid separated therefrom by centrifuging or filtration. The solution, retaining some potassium chlorid, with the borax and boric acid and other salts, is permitted to further cool and deposit additional potassium chlorid, from which it is removed and it may then be suitably treated to remove borax therefrom and thereafter the solution may be mixed with other solutions that are undergoing the preceding steps of the process.

What we have described is a preferred application of our process to crystals of potassium chlorid, borax, and other salts, resulting from the evaporation of material solutions, as described in the first steps of our process. We can also apply our process by effecting complete solution of such mixed crystals as we describe as first obtained, and then add to the solution the requisite amount of acid to convert a sufficient quantity of the borax to boric acid to enable potassium chlorid to separate on causing the solution to concentrate by the application of heat and thereafter cooling.

The process may be applied to any concentrated solution containing potassium chlorid and borax, but it is, of course, preferable to remove as far as practicable the carbonates of sodium before making addition of acid. A suitable acid for the purpose may be any of the mineral acids, or chlorin may be used to effect the decomposition and acidification required.

The essential feature of the discovery that we have made is that the solubility of a mixture of borax and boric acid is greater than that of either of them separately and increases up to a proportion of 2 to 1 with the degree to which these two compounds approach equality in the mixture.

This increase in the approach to equality may be obtained by the addition of either boric acid itself to borax or by the addition of another suitable acid which will convert part of the borax into boric acid.

In practice, it will not be generally desirable to render nearly equal the amounts of the borax and boric acid in the mixture more than in the proportion of two parts by weight of borax and one part of boric acid, on account of the cost of the acid which would be necessary to effect this nearer approach to equalization.

While in actual practice, the process will generally be applied to separate a more soluble salt, such as potassium chlorid, from borax, yet since our discovery has been that either borax or boric acid may be rendered more soluble by its mixture with the other named substance, it follows that the same process may be applied for separating boric acid from a more soluble salt or salts. The novel step will be then, whether applied to the separation of borax or of boric acid, to increase the quantity in the mixture relative to the other, of either substance, borax or boric acid, which occurs therein in the smaller amount by weight, or, in other words, to more nearly approach to equalization the proportions of borax or boric acid in the mixture, whether this approach to equalization be effected either by converting some of the borax into boric acid, or conversely, or by adding borax or boric acid, as the case may be, to the mixture.

We claim:—

1. The method of separating potassium chlorid and borax consisting in converting a sufficient portion of the borax to boric acid by treatment with an acidifying agent in aqueous solution, to so increase the solubility of the unaltered borax and the thus formed boric acid to the extent necessary to enable potassium chlorid to be removed as crystals from the solution, and then removing the potassium chlorid from the solution which retains therein the borax and boric acid.

2. The method of adding boric acid to a solution containing potassium chlorid and borax to increase the solubility of the borax to the extent necessary to enable potassium chlorid to be separated therefrom by crystallization before the boron compounds.

NOAH WRINKLE.
WALTER A. KUHNERT.